Nov. 10, 1925.

A. D. KEENE 1,561,243

CONTROL FOR HEATING SYSTEMS

Filed Jan. 5, 1924

WITNESSES:

INVENTOR
Alvin D. Keene.
BY
ATTORNEY

Patented Nov. 10, 1925.

1,561,243

UNITED STATES PATENT OFFICE.

ALVIN D. KEENE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL FOR HEATING SYSTEMS.

Application filed January 5, 1924. Serial No. 684,528.

*To all whom it may concern:*

Be it known that I, ALVIN D. KEENE, a citizen of the United States, and a resident of Pittsburgh, in the county of Allegheny and State of Pennsylvania, have invented a new and useful Improvement in Controls for Heating Systems, of which the following is a specification.

My invention relates to electric heating systems and particularly to control means for electric water heating systems.

The object of my invention is to provide a relatively simple and compact means for controlling the energization of an electric heating element for heating a fluid.

In practicing my invention, I provide a fluid container having an electric heating element associated therewith, with a pair of spaced electrodes having a porous member located therebetween.

The electrodes are electrically connected either in series circuit relation to the heating element or in a shunt control circuit and are normally located below the level of the fluid in the container.

Figure 1:
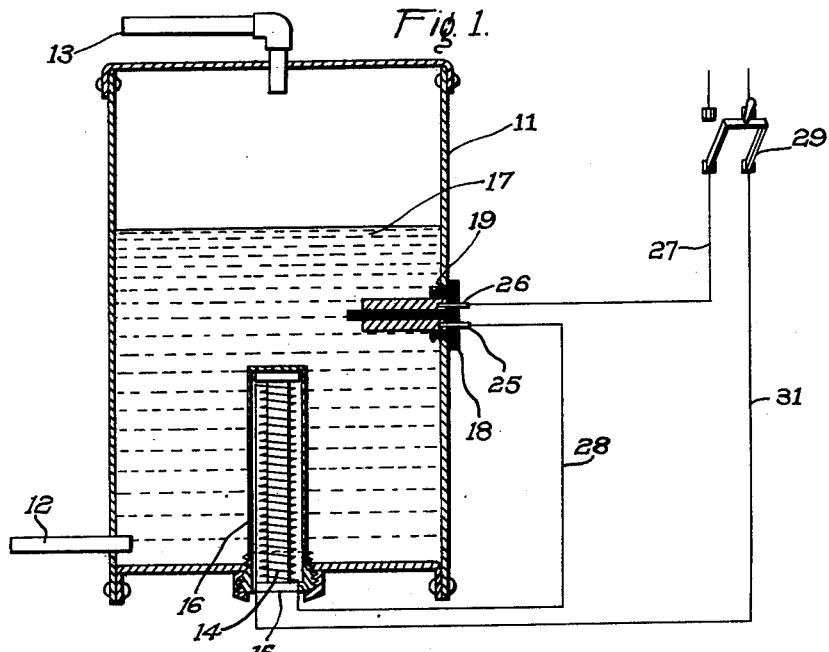
Figure 2:
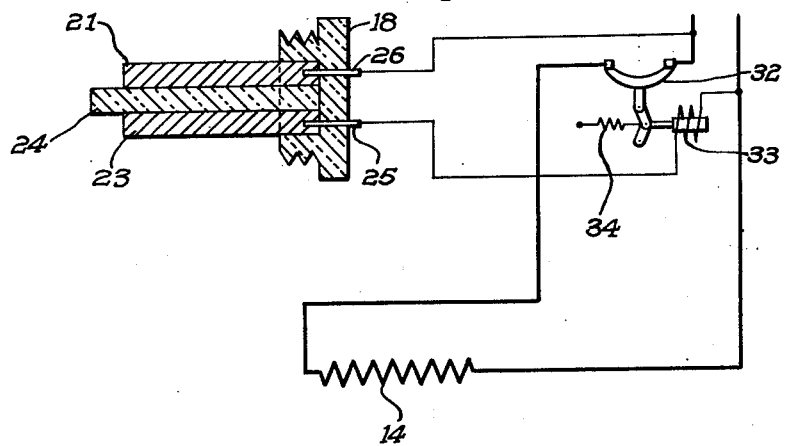

In the single sheet of drawings,

Figure 1 is a view, in vertical section, of a system and device embodying my invention, and Fig. 2 is a view of a modified form of control circuit and of a control means, the latter illustrated in section, embodying my invention.

A container 11 of any suitable size, shape and construction is provided with an inlet conduit 12 and an outlet conduit 13 in order to permit of fluid flowing therethrough, or of its being located therein, while being heated.

A heating unit for the container 11 comprises a resistor 14 that may be wound on a suitable refractory member 15, of electric-insulating material. The refractory member 15 is located within a tubular member 16 that is closed at one end. The other end of the tubular member 16 is provided with an enlarged portion having screw threads thereon to permit of properly securing the tubular member within the container 11 whereby the outer surface thereof shall be in operative engagement with a fluid 17 located therein.

While I have illustrated a specific construction of heating element, I do not wish to be limited thereto, as any desired type of heating element may be employed to heat the water within the container 11.

Means for controlling the energization of the heating unit comprising the resistor member 14, is located within the container 11 and comprises a screw cap member 18 that fits into a suitable opening 19 located in the side wall of the container 11 at a predetermined height therein from the bottom of the container.

A pair of spaced metal electrodes 21 and 23 have one end of each secured in the screw-cap member 18 and are separated by a porous member 24 extending therebetween. The porous member 24 may comprise a suitable refractory material or it may comprise a fibrous material, the main consideration being that it will receive and entrain or hold a quantity of the fluid 17 between the spaced electrodes 21 and 23 and thereby provide a path for an electric current between the two electrodes.

Terminal members 25 and 26, of any suitable or desired construction, operatively engage the electrodes 21 and 23 respectively, and have connected thereto electric circuit conductors 27 and 28. A double-pole switch 29 has one of its terminals connected to one end of the conductor 27 and has its other terminal connected by a conductor 31 to one end of the resistor member 14 of the heating unit, the other end of the resistor member 14 being connected to the other end of the conductor 28.

If the container has been substantially filled with the fluid 17, and if the switch 29 is moved to its closed position, a current will tranverse the circuit formed by the conductor 27, the electrodes 21 and 23 through the porous member 24 located therebetween, conductors 28, resistor 14 and back through the conductor 31. The resistor member 14 is thereby energized and such energization will continue so long as the control means, comprising particularly the electrodes 21 and 23 with the porous member 24 located therebetween, are submerged in the fluid 17 to permit of providing a path for the current as hereinbefore described.

If, for any reason, the supply of fluid should be cut-off while the resistor 14 is energized, or the fluid in the container 17 be evaporated after a period of operation, to such an extent that the level of the fluid falls below the two electrodes 21 and 23, the circuit therethrough will be interrupted. One reason for such interruption is, of course, the draining out of the fluid normally entrained in the porous member 24 and another reason is that a part of the fluid entrained or held by the porous member 24 is normally evaporated by reason of the current traversing the fluid held in or by the porous member and heating the same.

The hereinbefore described construction wherein the electrodes and the porous member are connected in series circuit relation to the heating element is more particularly applicable to relatively small heating units only.

Where the required capacity of the heating unit is relatively large, I employ the method illustrated more particularly in Fig. 2 of the drawings.

A circuit interrupting means 32 comprises a circuit breaker having a holding winding 33 and a spring 34 that is effective to open circuit breaker upon de-energization of the winding 33. The winding 33 is connected across the terminals of a suitable source of supply of electric energy in series circuit relation to the spaced electrodes 21 and 23. The resistor 14 is connected in series circuit relation to the terminal members of the circuit interrupting means 32. Upon energization of the system illustrated in Fig. 2, a current traverses the winding 33 of the circuit interrupter and the electrodes 21 and 23 as well as the porous member 24, and effects a closing of the circuit interrupting means to substantially the position illustrated in Fig. 2 whereby the resistor 14 is energized.

If the level of the fluid falls below the spaced electrodes 21 and 23, the coil 33 is de-energized and the spring member 34 effects the opening of the circuit breaker, thereby interrupting the circuit through the resistor 14.

Various modifications and changes may be made without departing from the spirit and scope of the invention, and I desire, therefore, that only such limitations shall be placed thereon as are imposed by the prior art, or are set forth in the appended claims.

I claim as my invention:

1. In an electric water heating system, the combination with a fluid container, and an electric heating element associated therewith, of a circuit-controlling means located in said container and comprising a pair of spaced terminals, and a porous member therebetween that is electrical-conducting when submerged in water.

2. In an electric water heating system, the combination with a fluid container, and an electric heating element associated therewith, of a circuit controlling means for said heating element located in said container and comprising a plurality of relatively immovable terminal members and a porous member therebetween, said means being effective to interrupt the circuit through said heating element when the water level in said container falls below a predetermined point.

In testimony whereof, I have hereunto subscribed my name this 26th day of December, 1923.

ALVIN D. KEENE.